United States Patent [19]

Ito et al.

[11] Patent Number: 4,624,177
[45] Date of Patent: Nov. 25, 1986

[54] COMBINED COFFEE GRINDING AND BREWING MACHINE

[75] Inventors: Nobuo Ito, Kani; Masashi Tajima, Kiryu, both of Japan

[73] Assignee: Kabushiki Kaisha Toshiba, Kawasaki, Japan

[21] Appl. No.: 741,554

[22] Filed: Jun. 5, 1985

[30] Foreign Application Priority Data

| Jun. 12, 1984 | [JP] | Japan | 59-87260[U] |
| Aug. 27, 1984 | [JP] | Japan | 59-130071[U] |
| Oct. 13, 1984 | [JP] | Japan | 59-154798[U] |
| Oct. 13, 1984 | [JP] | Japan | 59-154799[U] |

[51] Int. Cl.$^4$ .............................. A47J 31/42
[52] U.S. Cl. ...................... 99/286; 99/305; 241/101.2
[58] Field of Search .......... 99/286, 287, 289 R, 99/294, 295, 300, 279, 304, 305, 306, 307; 241/101.2, 258, 282.1, 282.2; 426/433

[56] References Cited

U.S. PATENT DOCUMENTS

| 2,517,073 | 8/1950 | Alvarez | 99/286 |
| 3,107,600 | 10/1963 | Brun-Buisson | 99/286 |
| 4,196,658 | 4/1980 | Takagi | 99/286 |
| 4,510,853 | 4/1985 | Takagi | 99/286 |

FOREIGN PATENT DOCUMENTS 130117 10/1981 Japan.
67134 5/1984 Japan.

Primary Examiner—Robert W. Jenkins
Attorney, Agent, or Firm—Schwartz, Jeffery, Schwaab, Mack, Blumenthal & Evans

[57] ABSTRACT

A coffee maker comprising both a mill assembly for grinding coffee beans, and a brewer assembly underlying the mill assembly for receiving coffee grains filtered out therefrom and for brewing coffee with heated water poured onto the coffee grains. The mill assembly has a mill housing having its top closed by a mill cap adapted to receive the heated water from a water heater. Projecting from the mill cap, in a position just over a coffee grain filter constituting a part of the mill assembly, a water chute conducts the heated water down onto the coffee grains that have been fed from the mill assembly into the brewer assembly. The interior of the mill housing is therefore not wetted with the heated water during the brewing but can be kept dry to allow immediate resumption of grinding as desired.

19 Claims, 14 Drawing Figures

COMBINED COFFEE GRINDING AND BREWING MACHINE

BACKGROUND OF THE INVENTION

This invention relates to coffee makers in general and, in particular, to an integrated coffee grinder/brewer combination, comprising a mill assembly for grinding coffee beans, and a brewer assembly for making coffee by pouring heated water on and through a mass of fine coffee grains that has been delivered from the mill assembly.

The coffee maker comprising both a mill assembly and a brewer assembly is per se not new in the art. A problem with this type of coffee maker has been the need, after the grinding of coffee beans into a desired size of grains by the mill assembly, for the manual transfer of the coffee grains from the mill assembly to a separate brewer. A conventional solution to this problem has been the provision of a grain filter to the housing of the mill assembly. With the progress of the grinding of coffee beans, the particles of the coffee beans are driven out of the mill housing through the grain filter and down into the brewer assembly. Heated water, produced by a water heater incorporated in the coffee maker, is subsequently directed into the mill housing and thence into the brewer assembly via the grain filter and an underlying water diffuser. Diffused by the water diffuser, the heated water pours down all over the mass of coffee grains in the brewer assembly.

This conventional solution is unsatisfactory, however, in the delivery of the heated water to the brewer assembly by way of the interior of the mill housing. The mill assembly remains wet for a while after brewing. If the user reintroduces coffee beans into the mill housing for making a fresh cup or cups of coffee while its interior is still wet, the mill assembly will fail to operate normally as the comminuted coffee grains will stick to the wet surfaces of the mill housing and will not go through the grain filter down into the brewer assembly.

A further objection to the prior art is the arrangement of the water diffuser just below the grain filter of the mill housing. Driven out of the mill housing through the grain filter, the coffee grains will fall in part on the water diffuser and thence down into the brewer assembly, with the consequent uneven accumulation of the coffee grains within the brewer assembly. The heated water subsequently poured down through such an uneven mass of coffee grains may not derive therefrom the full aroma, flavor, and strength of this beloved beverage.

SUMMARY OF THE INVENTION

The present invention has succeeded, in an integrated coffee grinding and brewing machine of the kind in question, in making coffee without directing heated water into and through the mill housing, so that the mill assembly lends itself to the immediate resumption of grinding after brewing without the difficulties encountered heretofore. The invention also makes possible the even accumulation of coffee grains within the brewer assembly for the utmost extraction of the essential coffee ingredients therefrom.

The invention may be briefly summarized as a combined coffee grinding and brewing machine including a motor-driven mill assembly having a mill housing for receiving coffee beans to be comminuted into a required size of coffee grains, the mill housing having a grain filter for allowing the coffee grains to be driven out of the mill housing, a brewer assembly disposed under the grain filter of the mill assembly for receiving the coffee grains therefrom, and a water heater for heating water preparatory to delivery to the brewer assembly. Characteristically, the mill housing has its top closed by a mill cap which is adapted to temporarily receive thereon the heated water from the water heater. A water chute extends from the mill cap toward the brewer assembly for pouring the heated water onto the coffee grains contained in the brewer assembly.

Thus, in the improved coffee maker of this invention, the heated water is first directed onto the mill cap and thence down the water chute into the brewer assembly, instead of being fed into and through the mill housing as in the prior art. The interior of the mill housing is therefore left unwetted by the water. It will also be appreciated that the conventional diffuser is removed from under the grain filter of the mill housing. Provided instead is the water chute extending from the mill cap over the grain filter. Although this water chute serves as a water diffuser as well, it does not interfere with the uniform deposition of the coffee grains into the brewer assembly.

The above and other features and advantages of this invention and the manner of realizing them will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
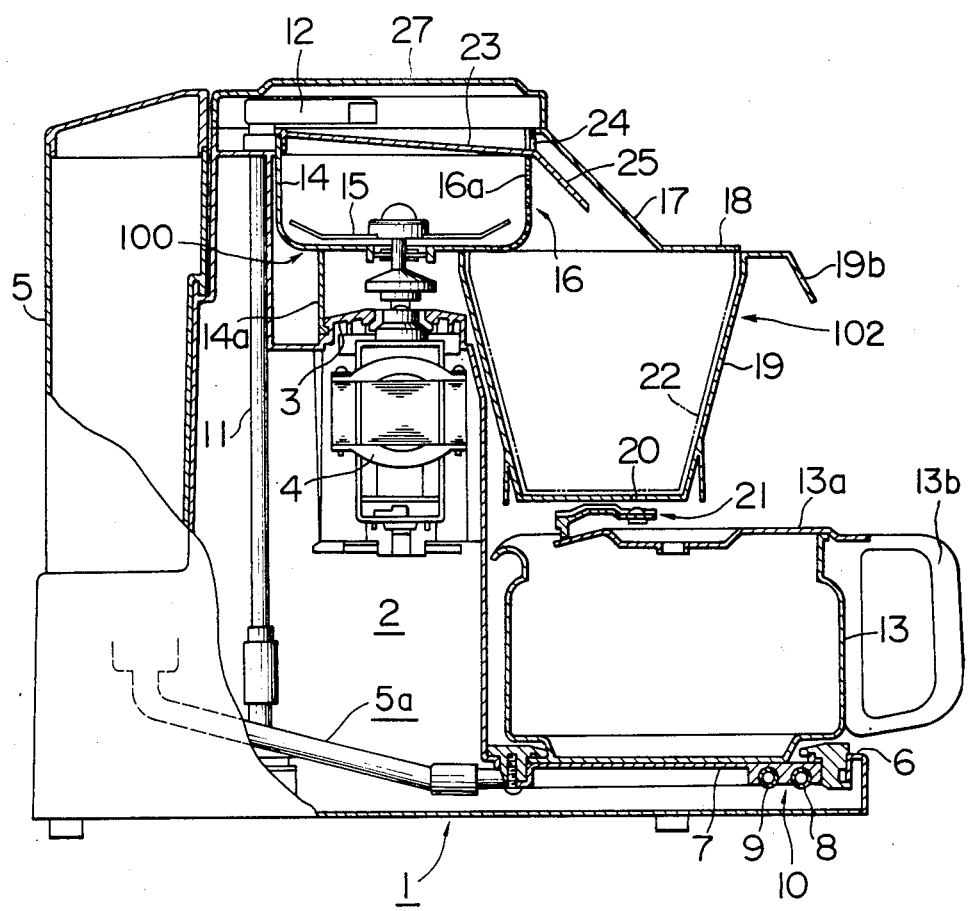
FIG. 1 is a vertical section, partly in elevation for illustrative convenience, through the combined coffee grinding and brewing machine constructed in accordance with the novel concepts of this invention.

With reference to FIG. 1 the representative coffee grinding and brewing machine (hereinafter referred to as the coffee maker for simplicity) in accordance with the invention has a casing 1 accommodating the various working parts and components of the machine hereinafter set forth. Defined centrally within the casing 1 is a motor chamber 2 accommodating an upstanding mill drive motor 4, with its output shaft oriented upwardly through a mill mount 3 on which there is removably mounted a mill assembly 100 to be described subsequently.

A detachable water reservoir 5 is mounted on the back, directed to the left in FIG. 1, of the casing 1, for supplying water by way of a conduit 5a to a water heater 10. This water heater comprises an electric heater 8 and a heat exchange conduit 9 in side-by-side arrangement. The heat exchange conduit 9 communicates with the water reservoir 5 by way of the conduit 5a on one hand and, on the other hand, with a conduit 11 extending upwardly toward the mill assembly 100 and terminating in a spout 12 pivotable in a horizontal plane. Arranged just over the water heater 10 is a heater panel 7 providing a mount 6 for a server pot 13 complete with a lid 13a and a handle 13b.

Figure 2:
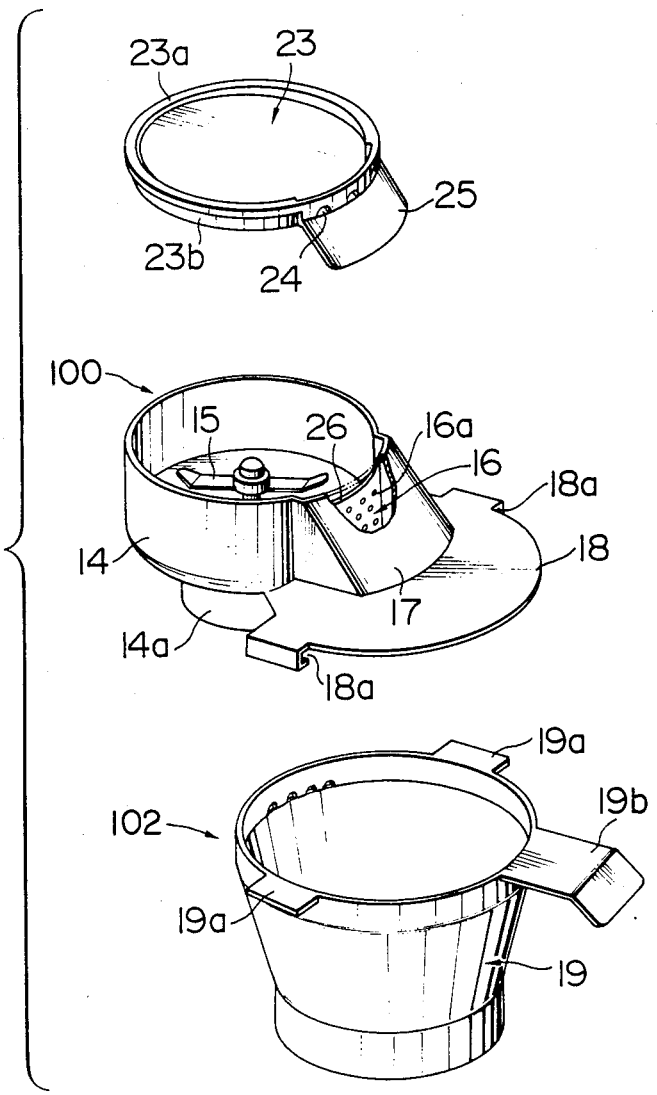
FIG. 2 is an enlarged, exploded perspective view of the mill assembly and brewer assembly of the machine of FIG. 1.

As shown also in FIG. 2, the aforesaid mill assembly 100 comprises a housing 14 in the form of an upstanding, bottomed cylinder, in which coffee beans are to be ground to a desired degree of fineness. The mill housing 14 has a cylindrical support 14a coaxially depending therefrom. The support 14a of the mill housing 14 is bayoneted or otherwise removably engaged with the mill mount 3. The mill housing 14 has a pair of rotary vanes 15 mounted centrally on its bottom for pulverizing the coffee beans that have been charged therein. The mill drive motor 4 has its output shaft detachably engaged with the rotary blades 15 for imparting rotation thereto.

Formed in a front part, shown directed to the right in FIG. 1, are a multiplicity of perforations 16a providing a grain filter 16. The coffee grains that have been produced within the mill housing 14 by pulverizing the coffee beans with the pair of rotary vanes 15 are to be centrifugally sent out of the mill housing through the grain filter 16. The mill housing 14 is formed in one piece with a front cover 17 bulging forwardly therefrom to enclose the path of the coffee grains, as well as that of heated water to be explaned presently. The front cover 17 slopes downwardly as it extends forwardly from the mill housing 14 and terminates in a planar brewer lid 18 of approximately semicircular shape. The brewer lid 18 is approximately on a level with the bottom of the mill housing 14.

Generally labeled 102 in FIGS. 1 and 2 is a brewer assembly disposed under the grain filter 16 of the mill assembly 100 for brewing coffee by pouring heated water from the water heater 10 on and through a batch of coffee grains from the mill assembly 100. The brewer assembly 102 includes a removable, open top brewer cup 19 in which suitable filter means such as, typically, a conventional paper filter 22 is to be placed in use, for receiving the coffee grains from the mill assembly 100. The brewer cup 19 has a grip 19b and a pair of tongues 19a protruding radially outwardly from a diametrically opposed positions on its top edge. These tongues 19a are to be slid into and out of a pair of grooves 18a formed in the brewer lid 18, for mounting and dismounting the brewer cup 19 to and from the rest of the machine. When the brewer cup 19 is mounted in position as in FIG. 1, its open top is in a coplanar relation with the bottom of the mill housing 14. The brewer cup 19 has a coffee exit port 20 formed through its bottom.

Under the brewer cup 19 there is provided a valve assembly 21 for opening and closing the coffee outlet port 20 of the brewer cup. When the server pot 13 is mounted in position on the heater panel 7, its lid 13a butts on the valve assembly 21, causing same to open the coffee outlet port 20 for the outflow of the coffee down into the server pot 13.

As shown also in both FIGS. 1 and 2, the mill assembly 100 includes a mill cap 23, constituting a feature of this invention, which serves the dual purpose of openably closing the open top of the mill housing 14 and of temporarily receiving thereon the heated water from the spout 12. The mill cap 23 is in the form of a disk having a raised annular rim 23a and a depending annular rim 23b, both extending along its periphery. The depending rim 23b is removably engaged in the open top of the mill housing 14. With the mill cap 23 thus mounted in position on the mill housing 14, its disklike portion lies on a sloping plane, declining as it extends forwardly. The mill cap rim 23a has a water outlet in the form of one or more openings 24 formed through its lowermost front portion for the egress of the heated water.

Guiding the heated water from the mill cap 23 toward the brewer assembly 102 is a water chute 25 in the form of a relatively broad tongue protruding forwardly from the water outlet 24 of the mill cap and sloping downwardly as it extends away from the mill cap. The water chute 25 is received in a recess 26, FIG. 2, cut in the top edge of the mill housing 14 and arranged interiorly of the front cover 17 so as to overhang the grain filter 16 of the mill housing. Seen at 27 in FIG. 1 is an openable top cover providing access to the mill housing 14.

In the use of this coffee maker, constructed as above described with reference to FIGS. 1 and 2, a measured amount of coffee beans is introduced in a desired blend into the mill housing 14, and the water reservoir 5 is filled with water. A paper filter is placed in the brewer cup 19, as dicated at 22 in FIG. 1. Then, with the water reservoir 5, server pot 13, mill assembly 100, and brewer assembly 102 mounted in positions as in FIG. 1, the user may proceed to set the mill drive motor 4 into rotation. Driven by this motor, the pair of vanes 15 of the mill assembly 100 will comminute the coffee beans into progressively finer grains. Those coffee grains having a size less than the diameter of the mill housing perforations 16a constituting the grain filter 16 will be centrifugally driven out therethrough into the confined space within the front cover 17 and thence down into the paper filter 22 in the brewer cup 19. As is apparent from FIG. 1, no interference exists between grain filter 16 and brewer cup 19, so that the coffee grains will deposit evenly on the bottom of the paper filter 22.

Following the complete pulverization of the charge of coffee beans within the mill housing 14, and the ensuing transfer of the ground coffee into the paper filter 22 in the brewer cup 19, the electric heater 8 of the water heater 10 is turned on for boiling the water that has been fed from the water reservoir 5 into the heat exchange conduit 9. The boiling water will be self propelled to climp up the conduit 11 to the spout 12, to flow out therefrom onto the mill cap 23. On this mill cap the heated water will flow down its sloping bottom and out onto the water chute 25 through the water outlet 24. Then the water will stream down the chute 25 and fall on the coffee grains that have previously been charged into the paper filter 22 in the brewer cup 19 from the mill assembly 100.

It is noteworthy in connection with the above described manner of water supply that the water chute 25 is arranged externally of the mill housing 14 to guide the heated water toward the brewer assembly 102 without admitting it into the mill housing. To wet the interior of the mill housing 14 by introducing the heated water into it, as has been the case heretofore, is objectionable for the reasons set forth previously. Further, being in the shape of a broad tongue as aforesaid, the water chute 25 serves the additional purpose of laterally diffusing or spreading out the stream of heated water from the mill cap 23, causing the water to fall diffusely on the even accumulation of the ground coffee in the brewer assembly 102. Thus, seeping uniformly throughout the mass of the coffee particles, the heated water will fully derive therefrom the desired flavor, aroma, and strength of coffee. The coffee so produced will flow through the paper filter 22 and down into the server pot 13 from the outlet port 20 at the bottom of the brewer cup 19.

Immediately after the brewing as above, the user may, as required or desired, introduce a fresh charge of coffee beans into the mill housing 14 for making another cup or cups of coffee. Since the interior of the mill housing 14 has been kept dry as in the foregoing, the mill assembly 100 will operate normally for grinding the coffee to a required degree of fineness.

An additional advantage of this embodiment is the reduced height of the casing 1 as a result of the relative arrangement of the mill assembly 100 and brewer assembly 102, with the bottom of the mill housing 14 disposed on a level with the top of the brewer cup 19. This advantage will become more understandable in comparison with the prior art coffee maker wherein the heated water is directed into the brewer through the interior of the mill housing and the grain filter. This conventional arrangement requires a space between mill housing and brewer for the installation of the water diffuser, with the corresponding increase in the total height of the machine. The improved coffee maker of the present invention demands no such space as the water chute 25, extending forwardly from the top of the mill housing 14, serves the purpose of a water diffuser as well.

Figure 3:
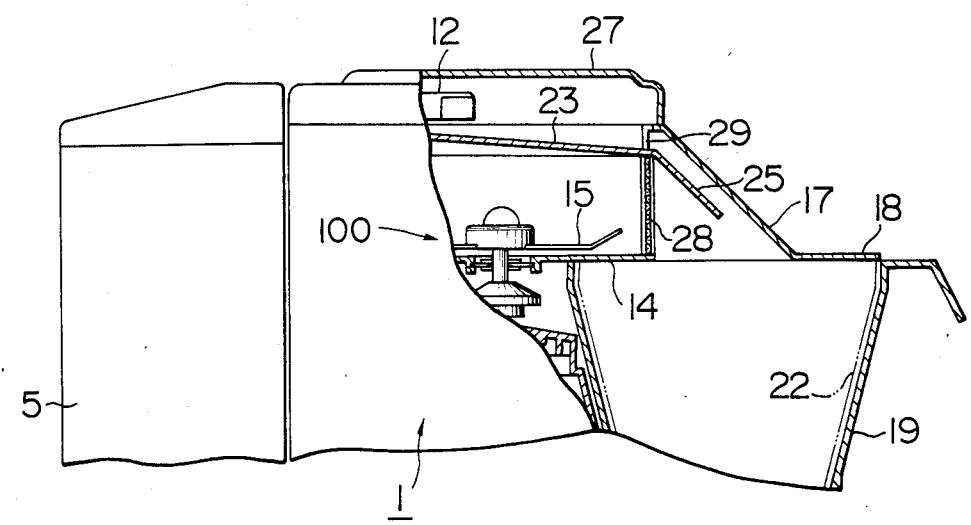
FIG. 3 is a fragmentary, vertical section, partly in elevation for illustrative convenience, through a slight modification of the machine of FIG. 1.
Figure 4:
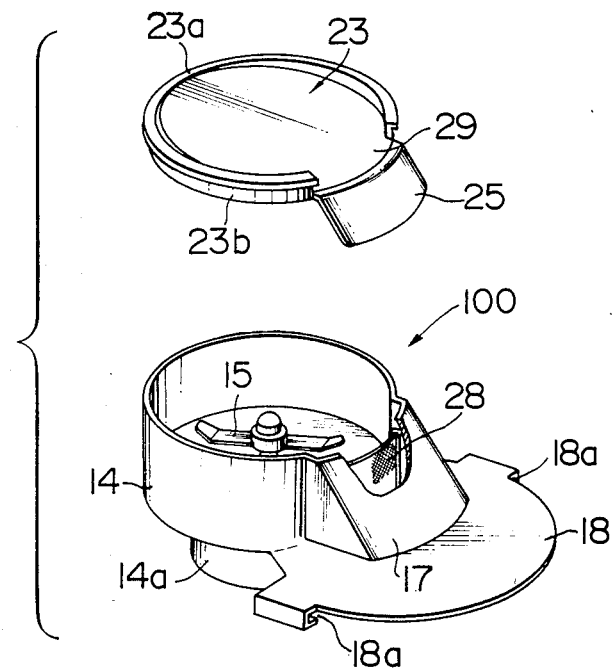
FIG. 4 is a perspective view of the modified mill assembly of FIG. 3, shown with its mill cap removed from the mill housing for clarity.

In FIGS. 3 and 4 is shown a modified mill assembly 100 for use in the coffee maker of FIGS. 1 and 2. The modified mill assembly features a grain filter 28 in the form of a wire mesh in substitution for the perforations 16a, FIGS. 1 and 2, constituting the grain filter 16 of the preceding embodiment. The mill cap 23 is also modified in having a recess 29 cut in its raised rim 23a to provide the water outlet open to the water chute 25. The other details of construction of the modified mill assembly 100 can be as set forth above in connection with FIGS. 1 and 2.

Figure 5:
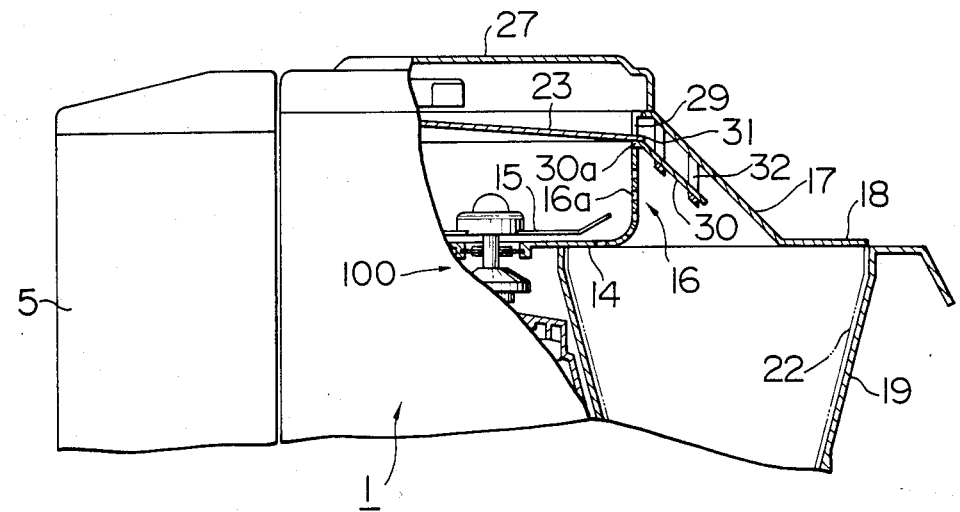
FIG. 5 is a view similar to FIG. 3 but showing a further modification of the machine of FIG. 1.
Figure 6:
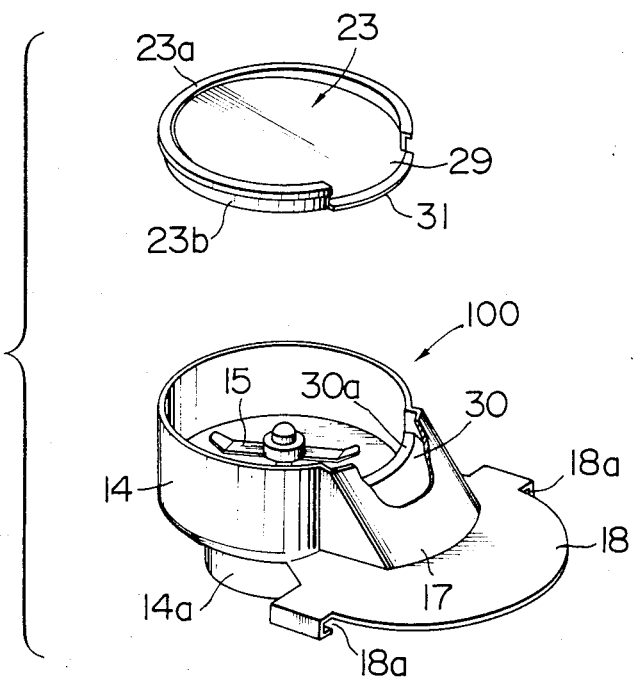
FIG. 6 is a view similar to FIG. 4 but showing the mill assembly of the machine of FIG. 5.

FIGS. 5 and 6 are illustrations of another modified mill assembly 100 for use in the coffee maker of FIGS. 1 and 2. A feature of this modification resides in a water chute 30 formed as a discrete member separate from the mill cap 23, rather than as an integral part of the mill cap as in the foregoing embodiments. This separate water chute 30 is braketed at 32 to the inside surface of the front cover 17 and has one end 30a adapted to be held closely against the underside of an arcuate outward extension 31 of the mill cap 23. The raised rim 23a of the mill cap 23 is recessed, as in the FIGS. 3 and 4 embodiment, to provide the water outlet 29 open to the arcuate extension 31.

Mounted as above within the front cover 17, the water chute 30 slopes downwardly as it extends away from the mill cap 23, just like the water chute 25 of the foregoing embodiments. It is therefore apparent that the heated water that has been poured onto the mill cap 23 flows out of the exit 29 onto the water chute 30 and thence down into the brewer cup 19, thus bypassing the mill housing 14.

Although the above disclosed embodiments have all the distinct advantages over the prior art, as set forth already, they have one inconvenience in common, in that they are not equipped to make "American" coffee (i.e. the coffee diluted with hot water), but only "regular" or full-strength coffee, as the water heated by their internal heater is wholly poured on the ground coffee within the brewer assembly. The use of water boiled by some external means is of course possible but troublesome. Thus, in FIGS. 7 and 8, a coffee maker is disclosed which is self-contained to make both "regular" and "American" coffee. In this embodiment, as well as in the additional embodiments to be disclosed subsequently, only the novel features will be described. The other parts and components will be merely identified in the drawings by the reference characters as used to denote the corresponding parts and components of the foregoing embodiments.

Figure 8:
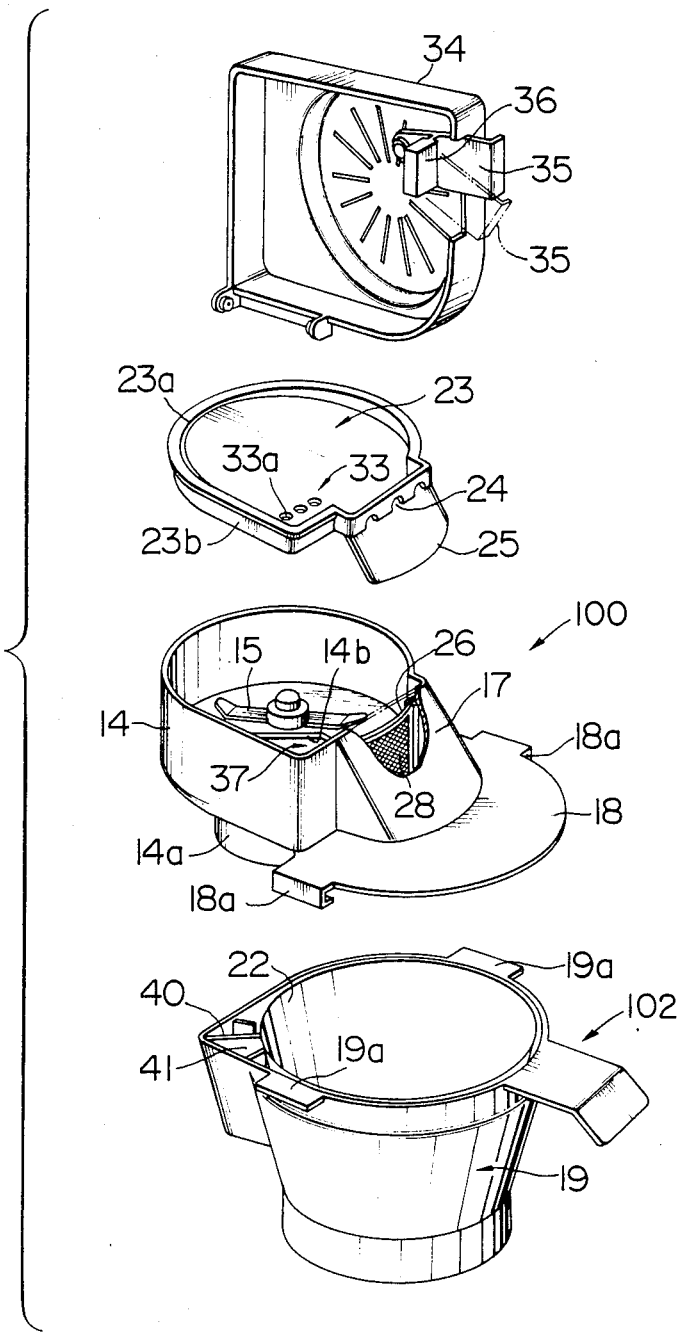
FIG. 8 is an enlarged, exploded perspective view of the mill assembly and brewer assembly of the machine of FIG. 7.

As better seen in FIG. 8, the mill cap 23 of this embodiment is provided not only with the water outlet 24 in the form of the openings in its raised rim 23a but also with a second water outlet 33 in the form of one or more openings 33a defined in its bottom. The second water outlet 33 is offset from an area immediately upstream of the first water outlet 24, in order that the heated water may flow out of the mill cap through either of the two outlets.

A top cover 34 is hingedly mounted on the top of the casing 1 so as to enclose the mill cap 23. Pivotally mounted on the underside of the top cover 34 is a select knob 35 in the form of a hand operated level partly protruding outwardly of the top cover 34. The select knob 35 has a valve member 36 in the form of a rectangular block depending therefrom. The valve member 36 closes the second water outlet 33 when the select knob 35 is in the solid line position of FIG. 8, causing the heated water to flow only through the first water outlet 24. The coffee produced then is of regular strength, so that the solid line position of hte select knob will be referred to as the "regular" position. Upon manipulation of the select knob 35 to the phantom position of FIG. 8, the valve member 36 opens the second water outlet 33 to allow the heated water to flow through both outlets 24 and 33. "American" coffee will be made in this case, through the procedure explained subsequently, so that the phantom position of the select knob 35 will be referred to as the "American" position.

While the first water outlet 24 is open to the water chute 25 as in the previous embodiments, the second water outlet 33 is open to a first water passageway 37 bypassing the mill assembly 100. Although the first water passageway 37 is shown defined within the mill housing 14 by a partition 14b, the water flowing therethrough is thoroughly kept away from the mill housing interior where grinding takes place.

The first water passageway 37 is in direct communication with a second water passageway 41 bypassing the brewer assembly 102. In this particular embodiment the second water passageway 41 is defined within the brewer cup 19 by partitions 40 holding the paper filter 22 away from the second water passageway. The brewer cup 19 has a water outlet port 42 defined in its bottom to allow the heated water to drop from the second passageway 41 into the server pot 13.

Figure 7:
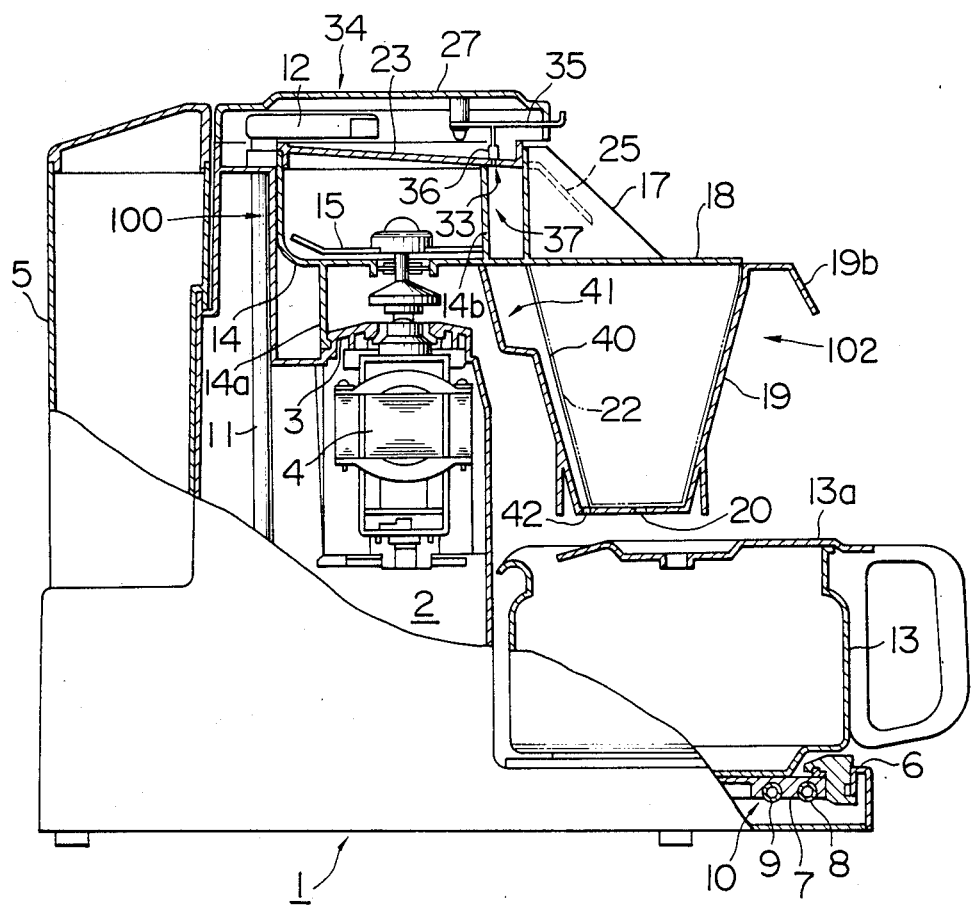
FIG. 7 is a vertical section, partly in elevation for illustrative convenience, through a further preferred form of the coffee grinding and brewing machine in accordance with the invention.

For making "regular" coffee by the machine of FIGS. 7 and 8, the user turns the select knob 35 to the "regular" position, thereby causing the valve member 36 to block the second water outlet 33 of the mill cap 23. The hot water from the water heater 10 will then flow wholly into and through the first water outlet 24 onto the water chute 25 and thence down onto the ground coffee that has previously been filtered out from the mill assembly 100 into the paper filter 22 in the brewer cup 19. The desired full-strength coffee can thus be collected in the server pot 19.

For the preparation of "American" coffee, on the other hand, the user may manipulate the select knob 35 to the "American" position, with the consequent uncovering of the second water outlet 33 of the mill cap 23. Upon subsequent delivery of heated water onto the mill cap 23 following the grinding process, a greater part of the water will leave the mill cap through the first water outlet 24 whereas the remainder will fall into the second water outlet 33. The water that has gone through the first water outlet 24 is of course delivered to the ground coffee in the paper filter 22 and so falls into the server pot 19 as the full-strength coffee. The water that has streamed into the second water outlet 33, on the other hand, falls into the first passageway 37 bypassing the mill assembly 100. It will therefore be seen that that part of the mill housing interior where coffee beans are actually ground, as well as the grain filter 28, is left unwetted by either of the water streams from the two outlets 24 and 33 of the mill cap 23. The water flows from the first passageway 37 down into the second passageway 41 bypassing the brewer assembly 102 and thence, through the water outlet 42, into the server pot 13, thereby diluting the full-strength coffee being collected therein from the brewer assembly through the coffee outlet 20.

One skilled in the art would readily conceive varioius modifications of the illustrated means defining the water passageways 37 and 41 from the second water outlet 33 of the mill cap 23 to the server pot 13. For example, instead of defining the second water passageway 41 within the brewer cup 19 by the partitions 40, a conduit might be provided externally of the brewer cup for conducting the heated water from the first water passageway to the server pot 13.

Coffee lovers are familiar with the paper filter 22 used in all the embodiments disclosed herein. It is formed by folding over a sheet of filter paper and by joining the meeting edges except where the filter is to form a mouth. The two plies or sides of the paper filter are held flat against each other prior to use. In use, then, the mouth is opened by spreading the sides apart from each other and holding them against the inside surfaces of the brewer cup. However, should the user fail to press the sides firmly against the brewer cup, the mouth will shut itself up again, creating gaps between the sides of the filter and the opposed walls of the brewer cup. The coffee grains filtered out from the mill assembly will then partly fall into the gaps and so will eventually find their way into the server pot as hot water is subsequently poured into the brewer cup, thereby impairing the flavor of the coffee. The coffee grains that have not been received in the paper filter may also clog up the coffee outlet at the bottom of the brewer cup, with the resulting overflow of the water with the coffee grains and, therefore, the soiling of the neighboring parts of the machine. Of course, falling unevenly on the coffee grains in the brewer cup from the water chute, the water will be incapable of extracting the full essence therefrom.

Figure 9:
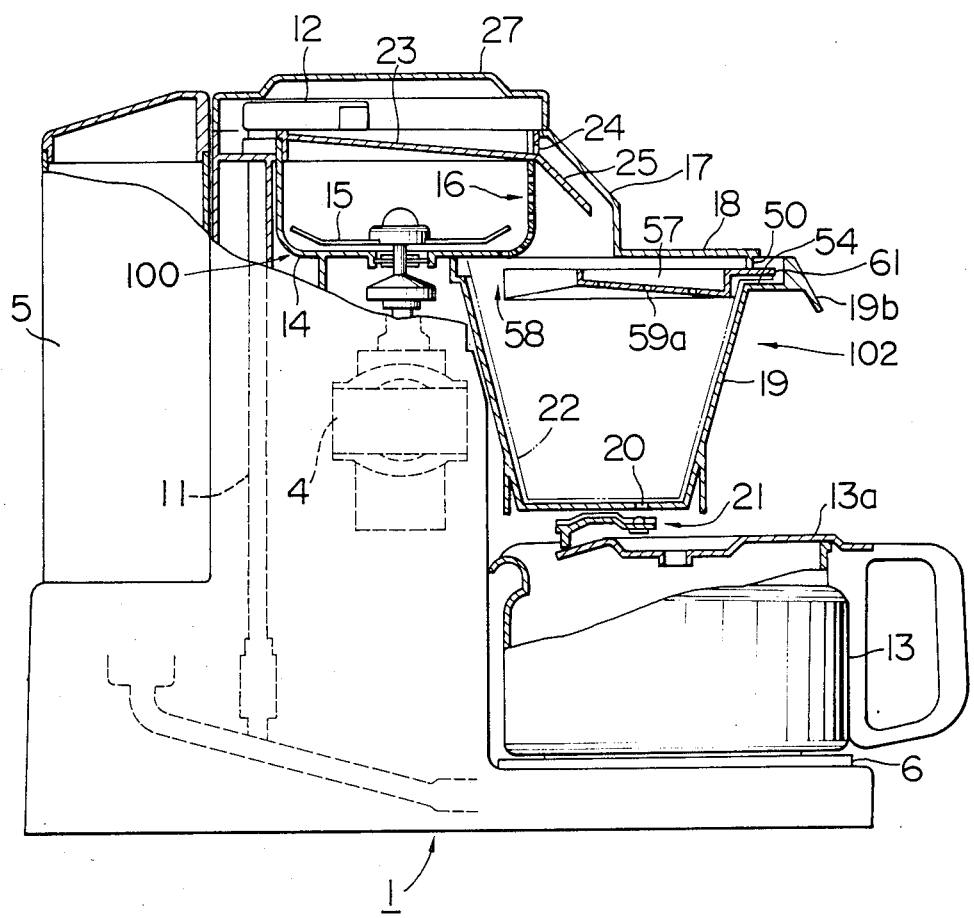
FIG. 9 is a vertical section, partly in elevation for illustrative convenience, through a further preferred form of the coffee grinding and brewing machine in accordance with the invention.
Figure 10:
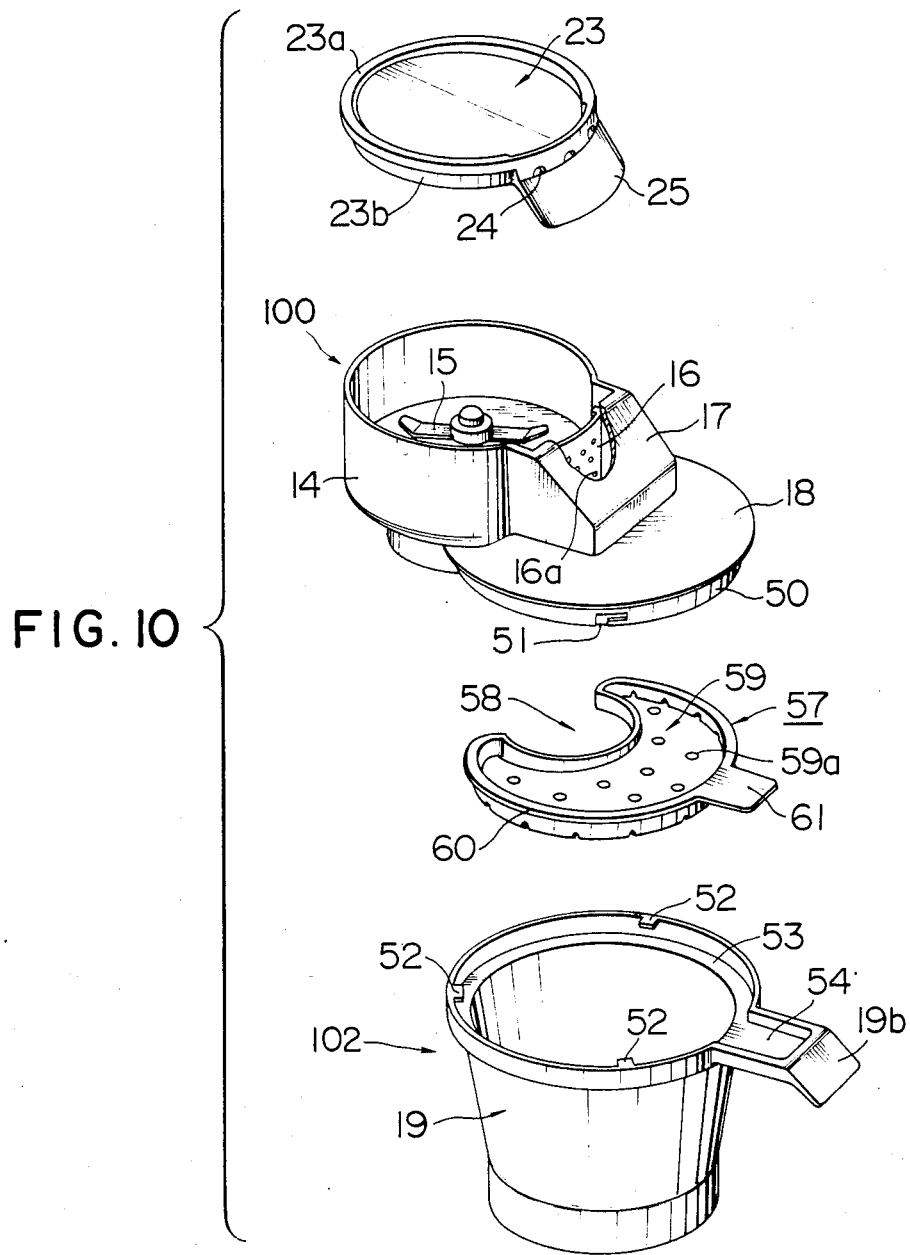
FIG. 10 is an enlarged, explosed perspective view of the mill assembly and brewer assembly of the machine of FIG. 9.

Thus, in a further preferred embodiment shown in FIGS. 9 and 10, a filter retainer 57 is provided for holding the filter paper 22 in shape within the brewer cup 19. The filter retainer 57 takes the form of a shallow pan, having a recess 58 defined peripherally therein so as to underlie the grain filter 16 of the mill housing 14 for the passage of the ground coffee down into the paper filter 22 in the brewer cup 19. The bottom of the filter retainer has a multiplicity of perforations 59a to provide a water passage or diffuser 59 through which the heated water is to fall diffusely on the coffee grains in the paper filter 22. As will be understood from FIG. 9, the perforated bottom of the filter retainer 57 is inclined, being highest at a point right below the water chute 25 and declining toward its forward peripheral portion which is away from the recess 58.

In order to be removably mounted on the open top of the brewer cup 19, the filter retainer 57 has a flange 60 around its periphery, and a positioning tongue 61 protruding radially outwardly or forwardly from the flange 60.

The brewer cup 19 of this embodiment is slightly modified to allow the filter retainer 57 to be removably mounted in position thereon. An annular shoulder 53 is formed internally along the top edge of the brewer cup 19 and is joined to a recess 54 cut in the grip 19b. The filter retainer 57 is to be mounted on the brewer cup 19 with the flange 60 of the former resting on the shoulder 53 of the latter via the top edge portions of the paper filter 22 caught therebetween. Further the positioning tongue 61 of the filter retainer 57 is engaged in the recess 54 in the brewer cup grip 19b, in order that the filter retainer may be held in a preassigned angular position thereon.

Further, in this embodiment, the brewer cup 19 is bayonet mounted to the underside of the brewer lid 18 formed integral with the mill housing 14. The brewer cup 19 has a plurality of bayonets or prongs 52 formed in angularly spaced apart positions on its top edge so as to project radially inwardly therefrom. The brewer lid 18 has an annular rim 50 depending therefrom, in which there are formed a plurality of L-shaped slots 51 in angularly spaced positions thereon. The brewer cup 19, together with the filter retainer 57 fitted therein as aforesaid, is detachably mounted to the under side of the brewer lid 18 by having it bayonets 52 engaged in the slots 51.

In the use of the coffee maker of FIGS. 9 and 10, the user may place the paper filter 22 within the brewer cup 19 detached from under the brewer lid 18, holding the two sides of the filter apart from each other and against the inside surface of the brewer cup. He may then mount the filter retainer 57 on the brewer cup 19, with its flange 60 of the filter retainer resting on the shoulder 53 of the brewer cup, and with the tongue 61 of the filter retainer received in the recess 54 in the brewer cup grip 19b. So mounted in position, the filter retainer will engage the top edges of the paper filter 22 between itself and the brewer cup, thereby holding the paper filter fully open within the brewer cup. Then the brewer cup 19 together with the filter retainer 57 thereon may be bayonet mounted to the underside of the brewer lid 18 by inserting the bayonets 52 in the slots 51.

As the filter retainer 57 is mounted on the brewer cup 19 with its positioning tongue 61 engaged in the recess 54 in the brewer cup grip 19b, and as the brewer cup is mounted in the predetermined angular position on the underside of the brewer lid 18, the recess 58 in the filter retainer 57 will be positioned just below the grain filter 16 of the mill housing 14. Consequently, the coffee grains that have been driven out of the mill housing 14 through its grain filter 16 will fall into the paper filter 22 through the recess 58 in the filter retainer 57. Being held fully open by the filter retainer 57, the paper filter 22 will receive all of the coffee grains from the mill assembly 100. The mill assembly 100 may creates currents of air by the rotation of its pair of vanes 15, and such currents may flow into the brewer assembly 102, tending to expel the coffee grains from within the brewer cup 19. However, practically closing the top of the brewer cup 19 except where the coffee grains fall into it, the filter retainer 57 serves the additional purpose of confining the coffee grains within the brewer cup in the face of such currents of air.

Following the complete grinding of the charge of coffee beams, hot water will be supplied from the water heater 10 onto the mill cap 23 and thence, down the water chute 25 onto the sloping, perforated bottom of the filter retainer 57. The water will then spread all over this bottom of the filter retainer by partly flowing toward its periphery and, dropping through its perforations 59a, will fall evenly on the entire mass of coffee grains in the paper filter 22. It is thus seen that the filter retainer 57 serves not only as such but also as a water diffuser.

The ground coffee from the mill assembly has been thoroughly received in the paper filter 22 as above. During the subsequent brewing, therefore, there is no possibility of the coffee grains streaming into the server pot with the water to the impairment of coffee favor, or of the coffee grains clogging up the coffee outlet port 20 of the brewer cup 19.

Figure 11:
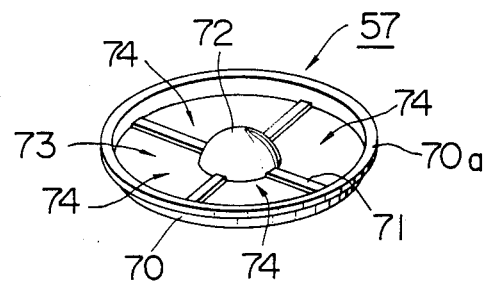
FIG. 11 is a perspective view of a modified filter retainer for use in the machine of FIG. 9.

FIG. 11 is an illustration of a modified filter retainer 57 for use in the coffee maker of FIGS. 9 and 10 in substitution for the filter retainer used therein. The modified filter retainer 57 comprises a ring or very short cylinder 70 having a top flange 70a, for engagement in the shouldered top of the brewer cup 19, FIGS. 9 and 10, so as to hold the top edges of the filter paper 22 therebetween. The flanged ring 70 is joined to a convex water diffuser 72, disposed centrally therein, via a plurality of ribs 71 of radial arrangement. The water diffuser 72 is effective to diffuse the heated water falling thereon and hence to cause it to drop evenly on the coffee grains in the paper filter. The spaces left between ring 70 and diffuser 72 can be used as the passages 73 for the ground coffee from the mill assembly 100 and as the passages 74 for the hot water from the chute 25.

Figure 13:
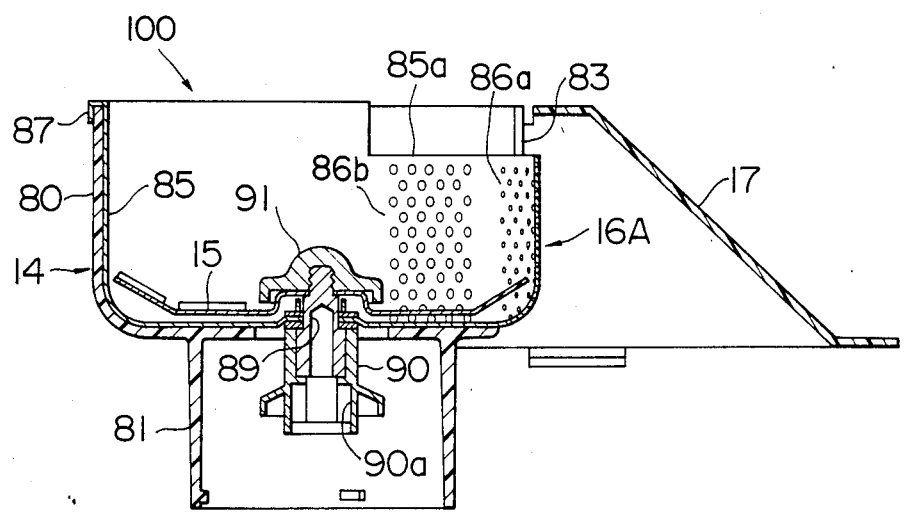
FIG. 13 is an enlarged verical section through the mill assembly of the machine of FIG. 12.
Figure 12:
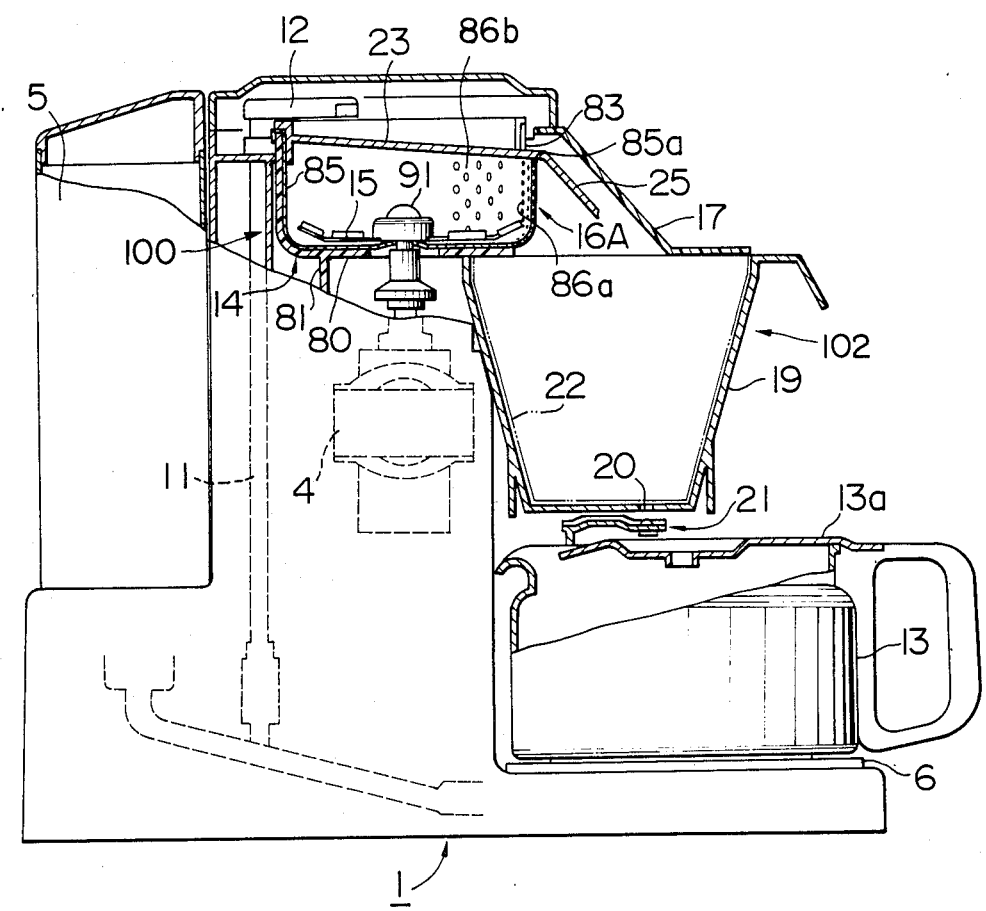
FIG. 12 is a vertical section, partly in elevation for illustrative convenience, through a further preferred form of the coffee grinding and brewing machine in accordance with the invention.
Figure 14:
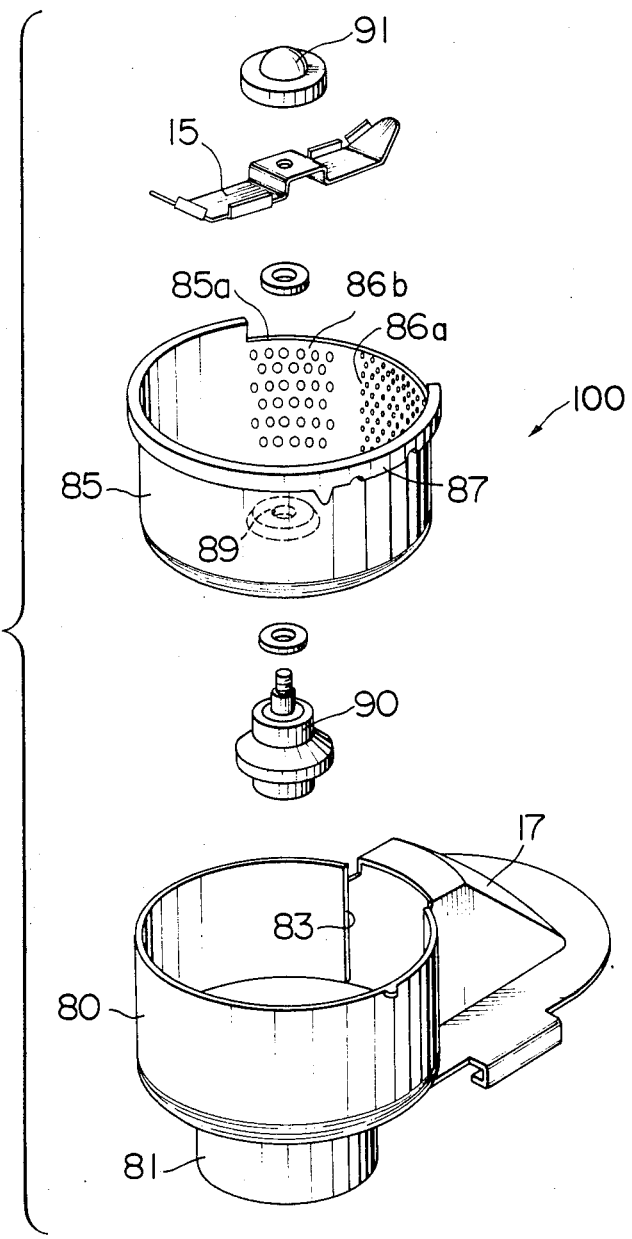
FIG. 14 is an exploded perspective view of the mill assembly of FIG. 13.

FIGS. 12, 13 and 14 illustrate a further preferred embodiment of the invention, which particularly features a dual wall mill housing 14. Violently thrown about by the pair of rotary vanes of the mill assembly, the coffee beans being ground rub against the inside surfaces of the mill housing. If the mill housing is a plastic molding, as has been the case heretofore, the violent rubbing of its inside surfaces by the coffee beans will frictionally generate so much heat as to denature the coffee grains, to the detriment of the flavor of the beverage prepared therefrom. The mounting of a separate grain filter, as in the form of a wire mesh, in an aperture in the plastic mill housing is also objectionable as the coffee grains are easy to be caught in the joints between the filter and the housing. Such grains will not easily come out if the mill housing is cleaned. This of course is undesirable hygienically.

The dual wall mill housing 14 of this additional embodiment is free from the noted difficulties of the prior art. While the mill housing 14 appears in all of FIGS. 12, 13 and 14, the latter two figures more clearly indicate that it comprises a plastic-molded outer wall 80 and a metal-made inner wall 85, both in the form of hollow, upstanding, bottomed cylinders, with the inner wall 85 concentrically and slidably nested in the outer wall 80 for relative angular displacement. The outer wall 80 is molded integral with a tubular support 81 depending therefrom for bayonet mounting on the mill mount seen at 3 in FIG. 1. A rectangular recess 83 is formed in the front portion of the outer wall 80.

Formed by the deep drawing of sheet metal, the inner wall 85 is herein shown adapted to make possible the preparation of either strong or light coffee as desired. Toward this end the inner wall 85 has formed therein a first group of smaller diameter perforations 86a and a second group of larger diameter perforations 86b, which are circumferentially spaced from each other. The two groups of perforations 86a and 86b can be selectively brought into and out of register with the recess 83 in the outer wall 80 by the bidirectional rotation of the inner wall 85 relative to the outer wall 80, thereby providing a two-sectable-mesh grain filter 16. The first group of smaller diameter perforations 86a is intended for the production of relatively fine coffee grains suitable for the preparation of regular-strength coffee, and the second group of larger diameter perforations 86b for the production of more coarse particles for the preparation of less strong coffee.

An indentation 85a is formed in the top edge of the inner wall 85, in a position above the two groups of perforations 86a and 86b, for the passage therethrough of the water chute 25 projecting forwardly and downwardly from the mill cap 23 closing the open top of the mill housing 14. The top edge of the inner wall 85 is folded to fit over the top edge of the outer wall 80, thereby facilitating the manual withdrawal of the inner wall from within the outer wall for cleaning or like maintenance purposes.

At 89 in FIGS. 13 and 14 is seen a bore defined centrally through the bottom of the inner wall 85 to allow a drive spindle 90 to rotatably extend into the mill housing 14 from below. The pair of rotary blades 15, which preferably is of one piece construction as best seen in FIG. 14, is mounted on the top end of the drive spindle 90 and is held fast thereon by a cap nut 91. The drive spindle 90 has a socket 90a formed in its bottom end for detachably receiving the output shaft of the mill drive motor 4, so that the rotation of this motor is imparted to the pair of rotary blades 15 via the drive spindle 90.

For making coffee of regular strength by the device of FIGS. 12 through 14, the user may turn the inner wall 85 of the mill housing 14 with respect to the outer wall 80 to bring the first group of smaller diameter perforations 86a into register with the recess 83 in the outer wall. Upon grinding of coffee beans by the mill assembly 100, the coffee grains produced will be centrifugally set out of the mill housing 14 through the grain filter 16A when they grow less in size than the first group of perforations 86a. This relatively fine grind of coffee is collected in the paper filter 22 within the brewer cup 19 of the brewer assembly 102. The desired strength of coffee can be completed as water heated by the water heater 10 is subsequently poured on this ground coffee from the mill cap 23 via the water chute 25.

The metal-made inner wall 85, having a relatively low coefficient of friction, will generate considerably less heat during the above operation of the mill assembly 100 than if it were fabricated from a plastic, no matter how violently the coffee beans rub against its inside surfaces. No appreciable thermal degradation of the coffee will therefore take place. Furthermore, the conventional plastic mill housing, the metal-made inner wall 85 in accordance with the invention will not produce chips that would find their way into the brewed coffee.

For the preparation of less strong coffee, on the other hand, the user may turn the inner wall 85 of the mill housing 14 until the other group of larger diameter perforations 86b comes into register with the recess 83 in the outer wall 80. The particles subsequently produced by the grinding of coffee beans will be sent out of the mill housing 14 when their size become less than that of the larger diameter perforations 86b. The relatively coarse coffee grains thus collected in the paper filter 22 within the brewer cup 19 will yield light coffee when hot water is poured thereon through the above described procedure.

The composite wall mill housing 14 offers several other advantages over the prior art. One is the absence of joints or seams, such as those where the coffee particles might be arrested, between the preforations 86a and 86b and the inner wall 85. Even though some particles will of course stick to the inside surfaces of the inner wall 85, it is easy to wash them clean of such particles.

The sheet metal of which the inner wall 85 is made can be of minimal thickness to expedite the process of deep drawing. Mounted within the plastic outer wall 80, the inner wall 85 of such reduced thickness will be thereby reinforced, so that the complete mill housing will gain sufficient strength to perform the functions for which it is intended.

The metallic inner wall 85 further allows the drive spindle 90 for the pair of rotary vanes 15 to be mounted directly in the hole 89 in its bottom. The simplicity of this construction will become more fully appreciated when taken in light of the fact that the prior art plastic mill housing has has a metal bearing embedded in its bottom by the known insert molding precess.

An additional advantage of this embodiment is coffee beans can be found to two different degrees of fineness to make possible the preparation of correspondingly different strengths of coffee. This advantage is of an ancillary nature, however, as the composite wall construction itself of the mill housing offers the above stated advantages. Accordingly, the provision of the two separate groups of different diameter perforations is not essential. Only one group of uniform diameter perforations may be provided, and the the outer and inner walls 80 and 85 may be made nonrotatable with respect to each other, without departing from the scope of this invention.

What is claimed is:

1. In a combined coffee grinding and brewing machine including a motor-driven mill assembly having a mill housing for receiving coffee beans to be ground into grains, the mill housing having a grain filter for allowing the coffee grains to be driven out of the mill housing, a brewer assembly disposed under the grain filter of the mill assembly for receiving the coffee grains therefrom, and a water heater for heating water preparatory to delivery to the brewer assembly, the improvement comprising a mill cap closing an open top of the mill housing and adapted to temporarily receive thereon the heated water from the water heater, and a water chute extending from the mill cap toward the brewer assembly for pouring the heated water onto the coffee grains contained in the brewer assembly, whereby coffee can be brewed without wetting the interior of the mill housing with the heated water.

2. A combined coffee grinding and brewing machine as set forth in claim 1, wherein the bottom of the mill housing of the mill assembly is approximately on a level with the top of the brewer assembly.

3. A combined coffee grinding and brewing machine as set forth in claim 1, wherein the mill cap is in the form of a disk having a raised rim extending along its periphery, the rim having a water outlet for the outflow of the heated water, and wherein the water chute takes the form of a tongue extending outwardly of the mill cap from the water outlet and declining toward the brewer assembly.

4. A combined coffee grinding and brewing machine as set forth in claim 3, wherein the water outlet of the mill cap is in the form of at least one opening formed through the raised rim of the disk.

5. A combined coffee grinding and brewing machine as set forth in claim 3, wherein the water outlet of the mill cap is in the form of a recess defined in the raised rim of the disk.

6. A combined coffee grinding and brewing machine as set forth in claim 1, wherein the mill cap has a depending rim detachably engaged in the open top of the mill housing.

7. A combined coffee grinding and brewing machine as set forth in claim 1, wherein the mill housing is provided with a front cover enclosing the water chute and the path of the coffee grains from the grain filter of the mill housing down to the mill assembly.

8. A combined coffee grinding and brewing machine as set forth in claim 7, wherein the water chute is mounted to the chute cover, wherein the mill cap is in the form of a disk having a raised rim extending along its periphery, the rim having a water outlet for the outflow of the heated water onto an outward extension of the mill cap, and wherein the water chute has one end held against the underside of the mill cap extension.

9. A combined coffee grinding and brewing machine as set forth in claim 1, wherein the water chute is joined to the mill housing in a position above the grain filter.

10. A combined coffee grinding and brewing machine as set forth in claim 1, wherein the mill cap has first and second water outlets for the outflow of the heated water therefrom, the first water outlet being in communication with the water chute, the second water outlet being in communication with a first water passageway bypassing the mill assembly and thence with a second water passageway bypassing the brewer assembly, and wherein the second water outlet is selectively opened and closed by means activated manually, whereby when the second water outlet is opened, the coffee made by the brewer assembly can be diluted by the heated water from the second water passageway.

11. A combined coffee grinding and brewing machine as set forth in claim 10, wherein the brewer assembly comprises a brewer cup for receiving a paper filter therein, and wherein the second water passageway is defined in the brewer cup by partition means effective to hold the paper filter away from the second water passageway.

12. A combined coffee grinding and brewing machine as set forth in claim 10, wherein the means for opening and closing the second water outlet of the mill cap comprises a valve member operably supported by a top cover overlying the mill cap.

13. A combined coffee grinding and brewing machine as set forth in claim 12, wherein the valve member is carried by a hand lever pivotally mounted to the mill cover.

14. A combined coffee grinding and brewing machine as set forth in claim 1, wherein the brewer assembly comprises an open-top brewer cup for receiving a paper filter therein, and a filter retainer detachably engaged in the open top of the brewer cup for holding the paper filter in shape therein, the filter retainer allowing the passage therethrough of the heated water from the water chute down into the brewer cup and having a recess for the passage of the coffee grains from the mill assembly down into the brewer cup.

15. A combined coffee grinding and brewing machine as set forth in claim 14, wherein the filter retainer is in the form of a pan having a plurality of perforations formed therein for the passage of the heated water therethrough and also having the recess defined peripherally therein for the passage of the coffee grains.

16. A combined coffee grinding and brewing machine as set forth in claim 15, wherein the filter retainer is inclined, being highest at a point right below the water chute and declining toward its peripheral portion away from the recess.

17. A combined coffee grinding and brewing machine as set forth in claim 14, wherein the brewer cup has an annular shoulder for engagement with the filter retainer via an upper edge of the paper filter caught therebetween.

18. A combined coffee grinding and brewing machine as set forth in claim 1, wherein the mill housing of the mill assembly comprises an outer wall and a metal-made inner wall nested in the outer wall, the inner wall having a multiplicity of perforations to provide the grain filter exposed through a recess cut in the outer wall.

19. A combined coffee grinding and brewing machine as set forth in claim 18, wherein the outer wall and inner wall of the mill housing are both in the form of hollow cylinders, the inner wall being slidably received in the outer wall for angular displacement relative to same, and wherein the perforations in the inner wall are divided into a first group of smaller diameter perforations and a second group of larger diameter perforations, the first and second groups of perforations being selectively brought into and out of register with the recess in the outer wall by the angular displacement of the inner wall relative to the outer wall.

* * * * *